United States Patent [19]
Markovs

[11] Patent Number: 5,281,258
[45] Date of Patent: Jan. 25, 1994

[54] REMOVAL OF MERCURY IMPURITY FROM NATURAL GAS

[75] Inventor: John Markovs, Yorktown Heights, N.Y.

[73] Assignee: UOP, Des Plaines, Ill.

[21] Appl. No.: 992,318

[22] Filed: Dec. 21, 1992

[51] Int. Cl.$^5$ .............................................. B01D 53/04
[52] U.S. Cl. ...................................... 95/120; 95/123; 95/134; 95/902
[58] Field of Search .................... 55/31, 33, 59, 62, 72, 55/74, 75

[56] References Cited

U.S. PATENT DOCUMENTS

| | | | |
|---|---|---|---|
| 3,755,989 | 9/1973 | Fornoff et al. | 55/72 |
| 4,101,631 | 7/1978 | Ambrosini et al. | 423/210 |
| 4,484,933 | 11/1984 | Cohen | 55/33 X |
| 4,487,614 | 12/1984 | Yon | 55/33 |
| 4,783,203 | 11/1988 | Doshi | 55/62 X |
| 4,863,494 | 9/1989 | Hayes | 55/59 |
| 4,874,525 | 10/1989 | Markovs | 210/673 |
| 4,877,515 | 10/1989 | Audeh | 55/59 X |
| 4,892,567 | 1/1990 | Yan | 55/33 |
| 4,971,606 | 11/1990 | Sircar et al. | 55/59 X |
| 4,985,052 | 1/1991 | Haruna et al. | 55/62 X |
| 5,089,034 | 2/1992 | Markovs et al. | 55/62 X |
| 5,090,973 | 2/1992 | Jain | 55/62 X |

OTHER PUBLICATIONS

Barrer et al., J. Chem. Soc. (1967) pp. 19-25.
Engineering Data Book, vol. II, pp. 20-1 through 20-10, 1987.

Primary Examiner—Robert Spitzer
Attorney, Agent, or Firm—Thomas K. McBride; Richard G. Miller

[57] ABSTRACT

In processes for removing mercury vapor from natural gas streams by selective adsorption in fixed adsorbent beds, water is invariably adsorbed along with the mercury impurity. During the periodic purge regeneration of the adsorbent bed it is desirable to recover as much as possible of the desorbed mercury in the spent regeneration gas in liquid form to avoid reintroducing the mercury into the environment. Cooling this spent regeneration gas under the high pressure conditions involved to condense the mercury can result in the highly undesirable formation of hydrocarbon hydrates if temperatures low enough to condense an adequate amount of mercury are employed. In the process of the present invention, the spent regeneration gas stream, from which some mercury has been removed by cooling, is further treated in a desiccant bed so that it is possible to cool it further in order to condense and remove additional mercury without encountering hydrocarbon hydrate formation.

6 Claims, 1 Drawing Sheet

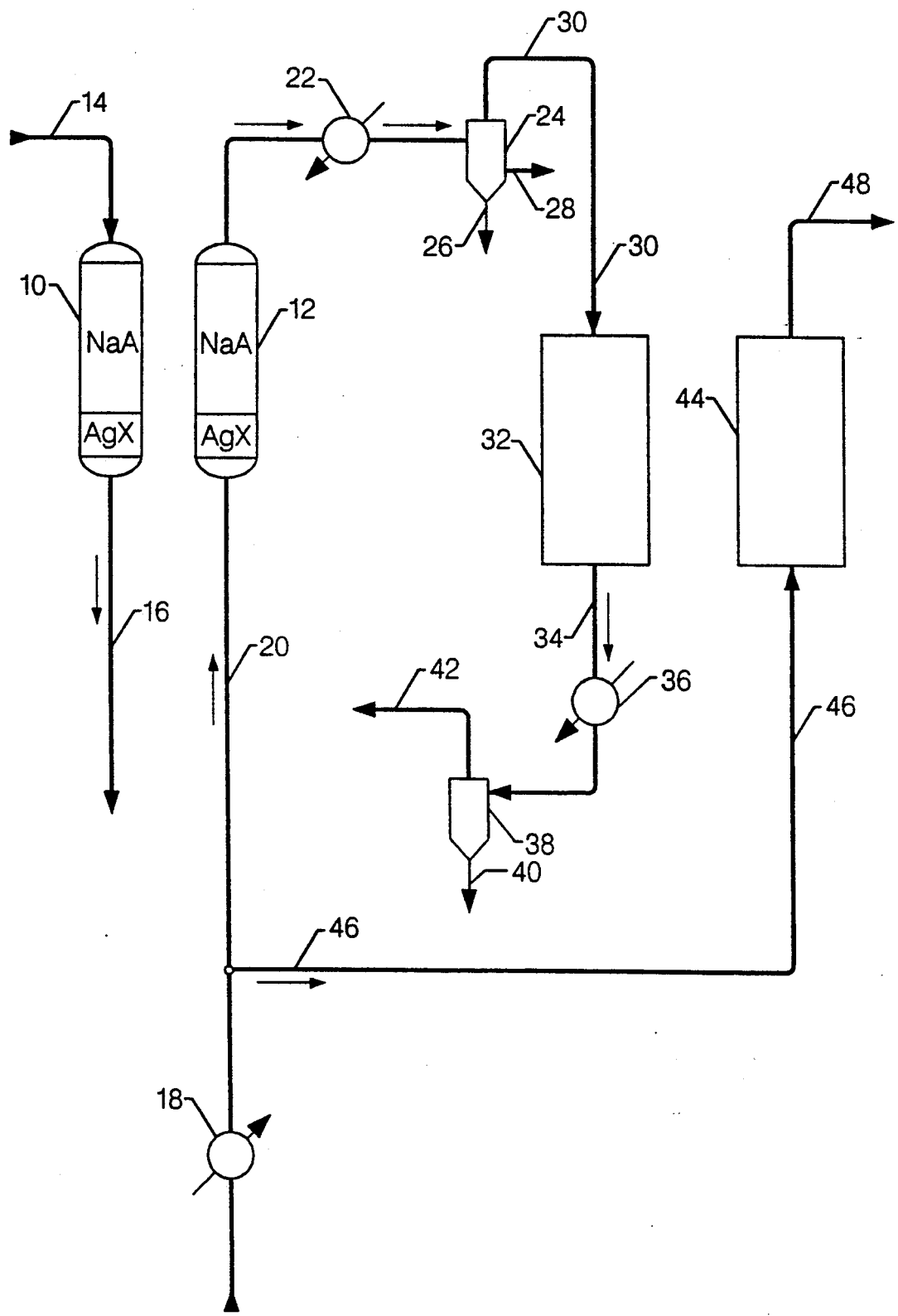

REMOVAL OF MERCURY IMPURITY FROM NATURAL GAS

FIELD OF THE INVENTION

The present invention relates in general to the purification of natural gas streams containing mercury and water vapor and more particularly to the treatment of such streams by means of adsorbing the mercury and water using an integrated system of at least one cyclically regenerated primary fixed adsorbent bed to remove the mercury and the water from the feedstock and at least one secondary fixed bed which serves as a desiccant to remove water from the gas stream which has been used to regenerate the primary bed. The desiccant bed is situated downstream from a condenser which initially treats the regeneration effluent from the primary bed. The removal of a water vapor from the condenser effluent by means of the desiccant bed permits the further cooling of the desiccant bed effluent to a temperature below that possible in the upstream condenser without the troublesome formation of hydrocarbon hydrates and hydrates of carbon dioxide if carbon dioxide is present in the stream being treated.

BACKGROUND OF THE INVENTION

Mercury is an undesirable constituent of all natural gas streams, and consequently a considerable number of methods have been devised to selectively remove the mercury. In the main the mercury impurity is in the form of elemental mercury, but in at least some instances mercury compounds, including organic mercury compounds, are also present. In the case of elemental mercury the purification processes are largely adsorption procedures, and in these the most common type of adsorbent is an activated carbon having supported thereon a mercury reactive material such as potassium triodide, sulfur, sulfuric acid, chlorine, silver, copper or various salts of silver or copper. Other supports for the mercury reactive materials include silicas, aluminas, silica-aluminas and zeolitic aluminosilicates. Ion-exchange resins, particularly the strongly basic anion-exchange types which have been reacted with a polysulfide, have also been reported as useful mercury adsorbents. See U.S. Pat. No. 4,591,490 (Horton) in this latter regard. The disclosures of U.S. Pat. No. 4,500,327 (Nishino) and U.S. Pat. No. 4,196,173 (de Jong et al) are pertinent to the use of activated carbon supports.

Perhaps the two greatest problems involved in removing mercury from natural gas streams are (a) achieving a sufficient reduction in the mercury concentration of the feed stream being treated, and (b) avoiding the reentry of the recovered mercury into some other environmental medium. Although permissible levels of mercury impurity vary considerably, depending upon the ultimate intended use of the purified product, for purified natural gas, a mercury concentration greater than about 0.01 microgram per normal cubic meter ($\mu g/nm^3$) is considered undesirable, particularly in those instances in which the natural gas is to be liquefied by cryogenic processing. To attain low concentration levels requires the use of relatively large adsorption beds and relatively low mercury loadings. If non-regenerable, the capital and adsorbent costs are uneconomical, and if regenerable, the regeneration media requirements are not only large but result in a large mercury-laden bed effluent which must itself be disposed of in an environmentally safe manner.

THE DRAWINGS

The sole FIGURE of the drawings is a schematic flow diagram showing one embodiment of the process system used in the practice of this invention

SUMMARY OF THE INVENTION

In accordance with the present invention the process comprises: (a) providing a natural gas stream containing at least 0.02, and preferably at least 2.0, $\mu g/nm^3$ of elemental mercury and at least 25 ppm(v) water; (b) passing said stream at a temperature within the range of 16° to 65° C. and at a pressure within the range of 25 to 2500 psia into a first fixed adsorption bed containing an adsorbent mass upon which said mercury and water are preferentially adsorbed whereby a mercury mass transfer front and a water mass transfer front are formed, mercury and water are adsorbed and a mercury-depleted and water-depleted stream is recovered as the effluent therefrom; (c) terminating the flow of said natural gas stream into said first fixed adsorbent bed prior to breakthrough of the mercury mass transfer front; (d) regenerating said first fixed bed by passing thereinto at a temperature higher than the temperature of the stream in step (b) and at a pressure of at least 25 psia, preferably in a direction countercurrent to the direction of flow therethrough during step (b), a purge desorbent having essentially the same chemical composition as the effluent from said first bed during step (b) whereby mercury and water are desorbed and removed from said bed in the effluent; (e) cooling said effluent in step (d) at a pressure of at least 25 psia to condense out a portion of the mercury and water content thereof while avoiding the formation of hydrocarbon hydrates; (f) recovering the condensed mercury and condensed water and passing the remainder of the fluid stream to a second fixed bed containing an adsorbent having a strong affinity for water and a weak affinity for mercury whereby an effluent from said second bed is produced having a decreased water content; and (g) cooling said effluent in step (f) to a temperature sufficiently low to condense out a portion of the mercury content thereof.

DETAILED DESCRIPTION OF THE INVENTION

Although the composition of natural gas varies somewhat with its source, its components include methane, nitrogen, higher hydrocarbons, carbon dioxide and trace amounts of hydrogen, mercury and inert gases. At the wellhead, natural gas is saturated with water vapor. Methane is by far the largest constituent and is generally present in amounts of greater than 85% by volume. Mercury is usually present in concentrations ranging up to about 22 parts per billion (vol.). A typical natural gas from the central section of the United States contains:

| Components | Conc., Vol. % |
| --- | --- |
| methane | 87.1 |
| ethane | 7.2 |
| propane | 2.0 |
| n-butane | 0.49 |
| isobutane | 0.43 |
| pentanes | 0.09 |
| hexanes | 0.06 |
| heptanes | 0.03 |
| nitrogen | 1.10 |

| Components | Conc., Vol. % |
| --- | --- |
| carbon dioxide | 1.15 |
| helium | 0.35 |
| mercury | 2 × 10⁻⁷ |
| water | (saturated) |

It is known in the art to remove mercury from natural gas streams using a wide variety of solid adsorbents. Any of these adsorbents which are regenerable by purge desorption using a predominantly methane regeneration gas stream are suitable for use in the present process. Such adsorbents are preferably those which contain cationic or finely divided elemental silver, gold, platinum or palladium carried on porous inorganic oxide supports such as alumina or aluminosilicates. The $Hg^{++}$ cation forms of zeolites X and Y are reported by Barrer et al [J. Chem. Soc. (1967) pp. 19–25] to also exhibit very large capacities for mercury adsorption due to the chemisorption of metallic mercury at the $Hg^{++}$ cation sites to form $Hg_2^{++}$ cations initially and then to proceed further to create clusters of mercury within the zeolite in accordance with the proposed equation $$Hg_2^{++} + xHg \rightarrow Hg_{x+2}^{++}$$

Copper sulfide carried on an alumina support has also been reported to be a satisfactory adsorbent for the bulk removal of mercury from gas streams.

An especially effective adsorbent for this purpose is one of the zeolite-based compositions containing cationic or finely dispersed elemental forms of silver, gold, platinum or palladium. A particularly preferred adsorbent of this type is disclosed in U.S. Pat. No. 4,874,525 (Markovs) wherein the silver is concentrated on the outermost portions of the zeolite crystallites. Zeolite A containing elemental gold is disclosed as an adsorbent for mercury in the later issued U.S. Pat. No. 4,892,567 (Yan).

All of the aforementioned adsorbents will adsorb water vapor in addition to the mercury. For economic reasons, and to achieve optimized drying which will permit a smaller investment in process apparatus, it is advantageous to employ a composite fixed adsorbent bed which contains in the bed section first contacted by the stream being treated an adsorbent having a high efficiency for the regenerative removal of water. The alkali metal aluminosilicate zeolites, such as sodium zeolite A and sodium zeolite X are very useful in this regard. A subsequent zone of the adsorption bed can be loaded with an adsorbent, such as silver-exchanged zeolite A or zeolite X, which has a high capacity for mercury. A composite bed of this kind is disclosed in U.S. Pat. No. 4,874,525.

Most of the suitable adsorbents for mercury also adsorb at least some of the higher hydrocarbon species commonly present in natural gas streams. For that reason the purified methane product used to purge regenerate the regenerable beds of the adsorption system is advantageously further treated to remove at least the bulk of these $C_2+$ hydrocarbons. Such a purge stream is commonly available as the overhead from a demethanizer unit. A purge desorbent having essentially the same chemical composition as the effluent product from the principal mercury-adsorbing beds is, accordingly, intended to include a methane stream from which mercury and higher hydrocarbons have been removed to acceptable levels, i.e., the stream consists essentially of methane.

In accordance with the present invention, natural gas feedstocks at temperatures of from about 0° C. to 65° C., preferably in the range of 16° C. to 60° C., and at pressures of 25 to 2500 psia are passed into primary adsorption beds for the principal purpose of selectively removing mercury. Since, however, all known solid mercury adsorbents will also inherently adsorb water vapor, carbon dioxide and the straight chain $C_2+$ hydrocarbons, the bed, at the time of impending breakthrough of the mercury mass transfer front, contains significant loadings of these adsorbates in addition to mercury at the time regeneration of the bed is to be commenced. Regeneration is accomplished by passing through the bed, preferably in a direction countercurrent to the direction of flow during the previous adsorption step, a portion of the natural gas feedstock previously purified. The regeneration gas is heated to at least 100° C., and preferably at least 200° C., higher than the temperature of the natural gas feedstock being treated in the bed, and is at a pressure of from 25 to 2500 psia. The effluent from the bed contains, over the course of the regeneration process, mercury vapor, water vapor and methane and some higher hydrocarbons. In order to recover the mercury, the bed effluent is chilled while at a pressure of from 25 to 2500 psia to a temperature of below 50° C., but not sufficiently low to result in the formation of hydrates of either $CO_2$ or hydrocarbons present in the stream.

The formation of hydrates is a function of the temperature and the pressure conditions existing in the chiller. The conditions at which hydrates form in hydrocarbon streams, such as natural gas, are described in Gas Processors Association's Engineering Data Book, Volume II, Tenth Edition, particularly at page 20-4. Hydrate formation must be avoided to prevent plugging of process piping and equipment. From an operational standpoint, it is generally not practical to cool the wet gas below a temperature which is about 20° F. above the theoretical hydrate formation temperature. This generally limits the cooling of the gas to a temperature not lower than about 70° F. In view of the need to avoid hydrocarbon and $CO_2$ hydrate formation, only a portion of the mercury of the regeneration gas stream can be removed using knock-out apparatus. In the present process, however, the vapor phase stream from the knock-out is passed through a second fixed adsorption bed containing a desiccant whereby the water content is lowered to below the concentration at which further cooling of the mercury-containing effluent stream is feasible without incurring hydrate formation.

The adsorbent employed in the desiccant bed is not a narrowly critical factor, but it is advantageous that it has a strong affinity for water vapor adsorption and a relatively weak affinity for mercury adsorption. The advantage lies in the fact that the desiccant bed is periodically regenerated, preferably using a portion of the same purified natural gas stream employed in the regeneration of the primary adsorption bed as described hereinabove. The bed regeneration effluent from the desiccant bed is ordinarily not further treated for mercury removal and its mercury content is thus reintroduced into the environment. Although, even at worst, the mercury content of this regeneration stream effluent is small, mercury concentrations are diminished in direct proportion to the amount of adsorbed mercury in the bed immediately prior to regeneration. Moreover, mercury which passes through the desiccant bed is available for recovery as liquid mercury by virtue of the cooling and knock-out procedure by which this effluent stream is treated without the complications involving hydrate formation. The effluent stream from the desiccant bed during the water-removal step is preferably cooled to at least 0° C. while at a pressure of from 25 to 2500 psia to recover a large percentage of its mercury vapor content as liquid mercury. The mercury-depleted stream from this second knock-out is disposed of, for instance, as fuel or it can be recycled to the primary adsorption bed along with the natural gas feedstock.

Preferred regenerable desiccants are aluminas, silica gel and zeolitic molecular sieves, especially those zeolites having framework $Si/Al_2$ ratios of less than about 18.

The process of the present invention is illustrated by the following example together with the flow diagram of the drawings. In the drawing the process system is represented by dual primary adsorption beds integrated with dual desiccant beds in a manner that continuous operation can be carried out by regenerating one primary and one desiccant bed while the other two beds are involved in the adsorption of water and mercury. It will be understood by those of routine skill in the art that not all of the conduits and valves which would be present in an actual process system are shown in the flow diagram. The placement of these flow-directing means is largely dependent upon the placement of the essential adsorption beds and is not a matter necessary to an understanding of the process.

Primary composite beds 10 and 12 each contain 49,000 pounds of ⅛" extruded sodium zeolite A pellets in the upper zone, and in the lower zone 7,970 pounds of ⅛" extruded zeolite X pellets having 13.6 weight percent silver as zeolite cations, 95 percent of which are located within 0.1 millimeters of the external surface of the pellets. Natural gas, from which $CO_2$ has previously been removed, containing 793 ppm(v) water vapor, 14 parts per billion [ppb(v)] mercury vapor and about 5 volume percent $C_2$-$C_7$ hydrocarbons, is passed into bed 10 through line 14 at a pressure of 555 psia, a temperature of 21° C. and a superficial space velocity of 35.3 feet per minute. Water vapor is adsorbed in the upper zone on the NaA zeolite. The resulting dried natural gas containing the mercury vapor then passes through the lower zone containing the AgX zeolite whereby the mercury content is reduced to less than 10 parts per trillion and is recovered through line 16. During the adsorption step in bed 10, bed 12 which has previously undergone the same adsorption purification step as in bed 10, is undergoing regeneration. A portion of the purified product natural gas from bed 10 from which most of the $C_2+$ hydrocarbons has been removed is passed through heater 18, wherein it is heated to 290° C., and a portion of the heated gas stream is directed at a pressure of 295 psia through line 20 countercurrently through bed 12. Mercury, water vapor and some $C_2$-$C_7$ hydrocarbons are desorbed from the two adsorption zones of the bed and the effluent is directed through chiller 22 in which the temperature is reduced to about 70° F. Under the existing pressure conditions, 290 psia, the formation of hydrocarbon hydrates is avoided so that in separator 24 condensed mercury vapor is removed as a liquid through line 26 and condensed water vapor is withdrawn through line 28. The vapor phase stream comprising principally methane saturated with water vapor and containing about 730 $\mu g/nm^3$ mercury vapor is then passed at a temperature of about 70° F. through line 30 into bed 32 which contains 2100 pounds of the same NaA pellets as in the primary beds 10 and 12. The effluent stream leaving bed 32 through line 34 is essentially free of water vapor, i.e., contains less than 1 ppm(v) $H_2O$, but contains at least 600 $\mu g/n^3$ mercury vapor. This effluent is further cooled in chiller 36 to a temperature of 16° F. whereby mercury is condensed and recovered as a liquid from separator 38 through line 40. The vapor phase effluent from separator 38 contains less than 45 $\mu g/nm^3$ and is removed from the system through line 42. During the adsorption step in bed 32, bed 44 containing the same quantity and kind of desiccant as in bed 32 is regenerated to remove the adsorbed water vapor. This regeneration is accomplished countercurrently using the portion of purified natural gas passing through heater 18 which is not utilized in the regeneration of primary bed 12. This regeneration gas stream passes through line 46 and is removed from the system, after passage through bed 44, via line 48.

It will be understood that the foregoing illustration is not intended to be limitational, and that many other embodiments of the invention will be obvious to those skilled in the art in view of the present disclosure.

What is claimed is:

1. Process for removing mercury vapor from a natural gas stream which comprises the steps of:
    (a) providing a natural gas stream containing at least 0.02 $\mu g/nm^3$ of elemental mercury and at least 25 ppm(v) water;
    (b) passing said stream at a temperature within the range of 0° to 65° C. and at a pressure within the range of 25 to 2500 psia into a first fixed adsorption bed containing an adsorbent mass upon which said mercury and water are preferentially adsorbed whereby a mercury mass transfer front and a water mass transfer front are formed, mercury and water are adsorbed and a mercury-depleted and water-depleted stream is recovered as the effluent therefrom;
    (c) terminating the flow of said natural gas stream into said first fixed adsorption bed prior to breakthrough of the mercury mass transfer front;
    (d) regenerating said first fixed bed by passing thereinto, at a temperature higher than the temperature of the stream in step (b) and at a pressure of at least 25 psia, a purge desorbent having essentially the same chemical composition as the effluent from said first bed during step (b) whereby mercury and water are desorbed from said bed in the effluent;
    (e) cooling said effluent in step (d) at a pressure of at least 20 psia to condense out a portion of the mercury and water content thereof while avoiding the formation of hydrocarbon hydrates;
    (f) recovering the condensed mercury and condensed water and passing the remainder of the fluid stream to a second fixed bed containing an adsorbent having a strong affinity for water and a weak affinity for mercury whereby an effluent from said second bed is produced having a decreased water content; and
    (g) cooling said effluent in step (f) to a temperature sufficiently low to condense out a portion of the mercury content thereof.

2. Process according to claim 1 wherein the natural gas stream provided in step (a) contains at least 2.0 $\mu g/nm^3$ of elemental mercury.

3. Process according to claim 1 wherein the adsorbent having a strong affinity for water and a weak affinity for mercury employed in step (f) is a zeolitic molecular sieve.

4. Process according to claim 3 wherein the zeolitic molecular sieve is zeolite A or zeolite X.

5. Process according to claim 1 wherein the adsorbent mass contains as the mercury adsorbent cationic or finely divided elemental silver, gold, platinum or palladium.

6. Process according to claim 5 wherein the silver, gold, platinum or palladium is supported on a zeolite or alumina structure.

* * * * *